Feb. 11, 1969  R. R. MONTGOMERY  3,426,447
INSTRUCTIONAL BOOKLET
Filed Sept. 26, 1966
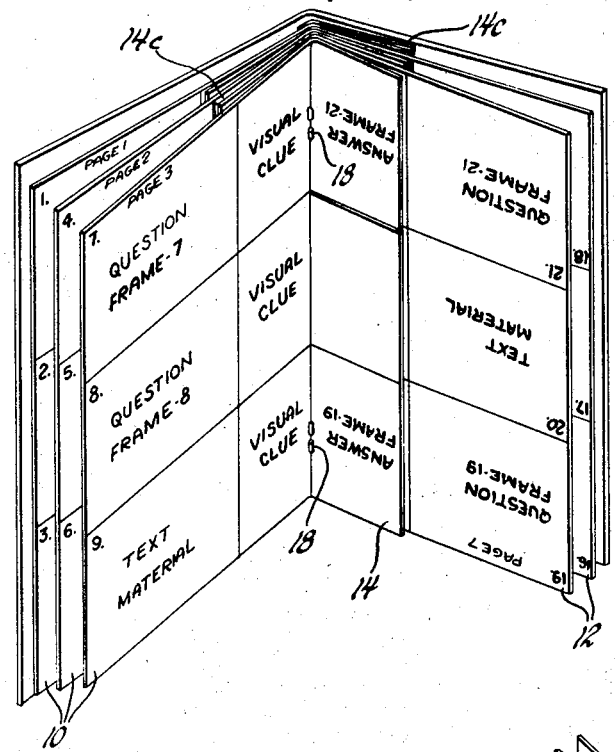
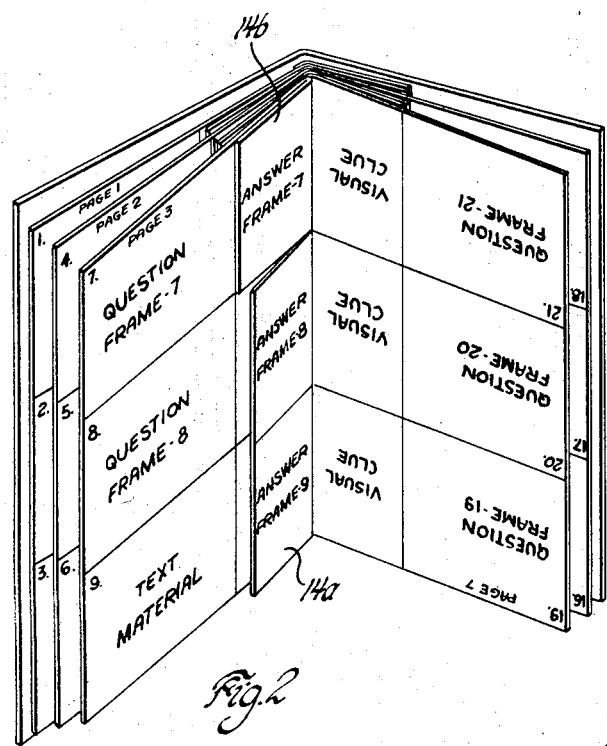
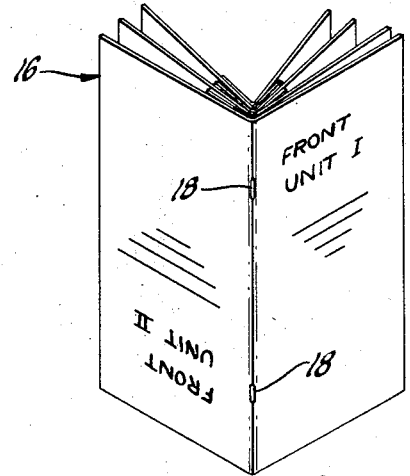
INVENTOR.
Robert R. Montgomery
BY
Barnard, McGlynn Leising
ATTORNEYS

United States Patent Office 3,426,447
Patented Feb. 11, 1969

3,426,447
INSTRUCTIONAL BOOKLET
Robert R. Montgomery, Livonia, Mich., assignor to Oakland Community College, Union Lake, Mich., a corporation of Michigan
Filed Sept. 26, 1966, Ser. No. 581,923
U.S. Cl. 35—9   6 Claims
Int. Cl. G09b 3/02

ABSTRACT OF THE DISCLOSURE

An instructional booklet having facing pages with information and response-evoking statements in upside down relationship thereon and smaller tabs situated toward the binding of the booklet having related responses in a visual line with selected information and response-evoking statements. With a given tab turned back, a visual clue is provided also in a visual line with the selected information and response-evoking statement and is then covered as the response is brought into view by turning the tab down.

---

This application relates to an instructional book, and more particularly to a textbook, or the like, suitable for individualized programmed instruction.

In the field of education, it is becoming more and more popular to use programmed or individualized instructional materials in teaching students both in elementary and secondary education, as well as in college education. In order to take maximum advantage of programmed instruction, it is desirable to use a specific kind of textbook of such nature that the student may learn and study at his own rate and need not rely entirely on the instructor teaching the materials in a classroom situation to an entire group of students. Such types of textbooks usually include text material along with questions and answers for the student's use so that the student may judge his learning and degree of absorption of the text material from time to time.

It is readily apparent that when the questions and answers appear in the same book as the text material, or when the answers to various questions appear along with the question itself, it is important that the student be able to cover or hide the answer until such time as is necessary to check his mental answer to the question asked. For example, a student may read a passage of text material which concludes with a question adapted to test whether or not the student has properly learned the text material. If the answer is available to the student at the same time as the question, it is apparent that the questioning process will be of little use. The book must be so designed that the answers to questions are hidden, or otherwise unavailable, until after the student has used his own mental ability to answer the question and determine whether or not he has properly learned the text material.

There are various kinds of programmed instruction textbooks available for use as described above. However, most of these textbooks are complicated to use and are expensive to print and produce. Many of these books require separate members of some sort that are used to cover up the answers to the questions, such separate materials easily becoming lost or broken, and thus destroying the effectiveness of the entire book. Other books require the student to turn a page or to cover an answer with his hand, thus momentarily exposing the answer to the question to the student and "short circuiting" his learning process.

Generally speaking, in programmed instructional books, the answer is in a single word and thus even a quick glance can register the answer in the student's mind. Such momentary exposure and quick registry destroys completely the individual determination of learning on the part of the student.

The device in which this invention is embodied comprises, generally, an instructional book having a plurality of pages, the left hand pages having the desired text material followed by questions where necessary. The pages that are on the right hand side also contain written material but such written material is upside down relative to the written material on the adjacent left hand pages. Disposed between the right hand and left hand pages are a plurality of tabs that are much narrower than the width of the right and left hand pages, and form intermediate leaves in the book. There is written material on both sides of the tabs, such that when the tab is laid over to cover a portion of the right hand page, the written material on the tab appears to be upside down relative to the written material on the left hand page. When the tab is turned so that it covers a portion of the left hand page, the written material on the tab is properly oriented in the same manner as the text and question material on the left hand page so that the answers to any questions or any other desirable information may be quickly available to the student.

In using the book, the student reads through using only the left hand pages and the proper side of the tabs. As he reaches the end of the book, he turns it completely over and proceeds through again, using only the left hand pages. Thus, the material which still is to come in the textbook is upside down to the student so that it does not register in his mind. When going through the book for the second time, that is, in the reverse direction, the upside down material has already been covered, and it is not necessary for the student to have such written material right side up.

The tab means disposed between the left and right hand pages may be in the form of a single narrow leaf, extending the height of the book, or it may be in the form of a plurality of tabs so that only a portion of the page will be covered by the tab. Thus, further space for text material or visual clues relating to the text material or questions are available. In addition, the tab means may include a plurality of leaves of very short dimension disposed between adjacent right and left hand pages. This gives the opportunity of providing a plurality of answers, or steps leading to an answer, to a given question or series of questions on the left hand pages.

An instruction book as above-described is simple to manufacture and produce, and is extremely easy to use to convey the desired information. The use of tab means between the right and left hand pages avoids "short circuiting" the learning process, and at all times keeps the answers to various questions covered. This avoids even the momentary disclosure to the student that would register in his mind. Sufficient space can be provided for text material, questions and visual clues leading to an answer on the full pages, and the answers to the various questions may be provided on the tabs. No extra supplies or other materials are needed with the instruction book that might become lost or broken, thus destroying the effectiveness of the book.

These and other advantages will become more apparent from the following description and drawing in which:

FIGURE 1 is a perspective view of an instruction book, showing the left hand and right hand pages and tab means there-between;

FIGURE 2 is a perspective view similar to FIGURE 1, showing the tab means turned toward the left hand page to disclose the answers to questions proposed on the left hand page; and FIGURE 3 is a perspective view of the outside of the instruction book.

Referring more particularly to the drawings, FIGURES 1 through 3 best illustrate the structure of the instruction book and the manner in which the text material, response evoking statements, information and responses are presented. The book is shown to include a plurality of left hand pages, indicated by the numeral 10, shown for convenience to be divided into three sections, or frames, individually numbered and within which written material such as information and response evoking statements may be printed. Also shown are a plurality of right hand pages, indicated by the numeral 12, with similar division into frames to provide printing space for written material such as information and response evoking statements such information and statements being written upside down relative to the information and statements on the left hand page 10.

Disposed between each of the left hand and adjacent right hand pages is a tab member, indicated by the numeral 14, which is provided with responses written on both sides thereof. As illustrated in FIGURE 1, when the tab member 14 is covering a portion of a right hand page 12, the response on the tab member 14 is upside down relative to the written material on the adjacent left hand page 10. It is also to be noted that the written response on the pictured side of tab member 14 is appropriate to the written material found on the right hand page 12.

When the tab member 14 is turned to cover a portion of the left hand page 10, as illustrated in FIGURE 2, the response written on the tab 14 is oriented in the same manner as the written material on the left hand page 10. The response written on the tab, as illustrated in FIGURE 2, is appropriate to the written material on the adjacent portion of the left hand page 10. Similar tabs are provided between each left hand page and its next adjacent right hand page, with the response on the tabs 14 being so oriented as to hide the response to the response evoking statement being made on the left hand page 10.

As best illustrated in FIGURE 2, tab 14 may be divided by horizontal cut to provide a plurality of tab members, such as tab member 14a and tab member 14b. In such manner, portions of the overall length of tab 14 may be turned as desired when following along the normal instructional material on the left hand page 10. Additionally, there may be provided a plurality of tab members between left hand and right hand pages such as tabs 14c, as illustrated in FIGURES 1 and 2. Tab members 14c may be divided into a plurality of tab members, such as tab members 14a or 14b, as desired.

As shown in FIGURE 3, a cover member may be provided, such cover member being illustrated generally by the numeral 16. Cover member 16 includes written material to indicate which is the beginning side of the instructional booklet, such as the notation "Front Unit I," indicating to the student that the book should be begun with that side of the cover up when he opens the book. In so doing, he will be properly oriented and will use the left hand pages for the written material and appropriate responses. Upon completing the book, using only the left hand pages, the student then turns the book over so that he is reading "Front Unit II" on the cover member 16, and he will then proceed through the book using only the left hand pages to the beginning.

Suitable binding means are provided to hold the entire assembly together, such assembly including the cover means 16, the pages 10 and 12, and the tab means 14. Any suitable binding means may be used, and for convenience the drawing illustrates standard staples 18 holding the various parts together.

Thus, an instructional book is provided which can include text materials, questions and answers, and any other desired material, suitable for use in individualized instruction for the student. The need for external members to hide or cover answers is alleviated, and the student can easily proceed through the material, testing his learning as he goes. The book is easily and economically produced, is self-contained, and is readily adaptable to almost any subject matter desired.

Numerous changes and modifications will occur to those having skill in the art after having had reference to the foregoing description and drawing. However, it is not intended to limit the scope of the invention by the foregoing, but by the scope of the following claims in which:

The embodiments of the invention in which an exclusive property or privilege is claimed are defined as follows:

1. An instructional book comprising: a plurality of left hand pages having information and response evoking statements written thereon; a plurality of right hand pages having information and response evoking statements written thereon and upside down relative to said written material on said left hand pages; and tab means disposed between each of said left hand pages and the adjacent right hand page, said tab means being of less dimension than said pages to selectively cover a portion of said adjacent left hand page or said adjacent right hand page, portions of said tab means having responses written thereon related to said information and response evoking statements on said right and left hand pages such that when said tab means cover a portion of said right hand page said responses written on said tab means are upside down relative to said left hand pages and when said tab means cover a portion of said left hand page said responses written on said tabe means are in the same orientation as said information and response evoking statements written on said left hand pages.

2. The instructional book set forth in claim 1 and further including binding means securing said pages and said tabs together.

3. The instructional book set forth in claim 1 wherein said tab means include a plurality of tabs disposed between each adjacent right hand and left hand pages.

4. The instructional book set forth in claim 3 wherein said plurality of tabs are in vertical array between adjacent right hand and left hand pages.

5. The instructional book set forth in claim 3 wherein said plurality of tabs are in adjacent array and adapted to be turned selectively between adjacent right hand and left hand pages.

6. The instructional book set forth in claim 5 wherein certain of said tabs are divided to be in vertical array between said right hand and left hand pages.

References Cited

UNITED STATES PATENTS

| | | | |
|---|---|---|---|
| 633,514 | 9/1899 | Hebert | 283—66 |
| 3,153,861 | 10/1964 | Rice | 35—9 |
| 3,200,514 | 8/1965 | Kopel | 35—9 |

EUGENE R. CAPOZIO, *Primary Examiner.*

W. W. NIELSEN, *Assistant Examiner.*